March 24, 1925.   1,530,736
J. F. O'CONNOR
FRICTION SHOCK ABSORBING MECHANISM
Original Filed July 9, 1923   2 Sheets-Sheet 2
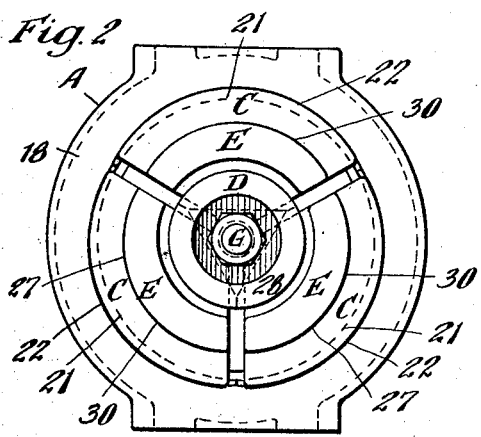
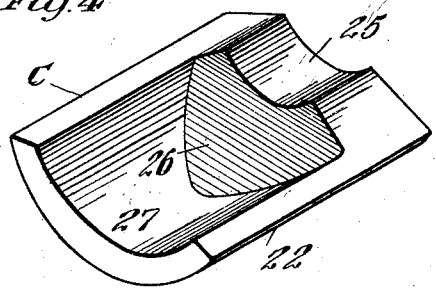
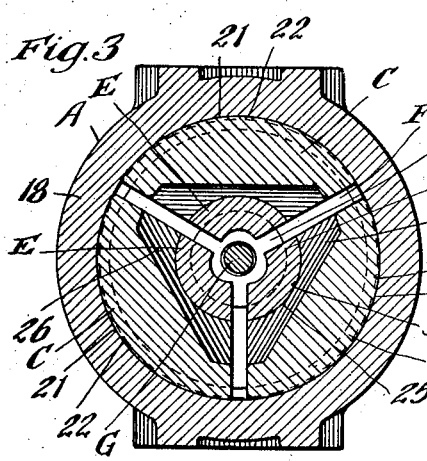
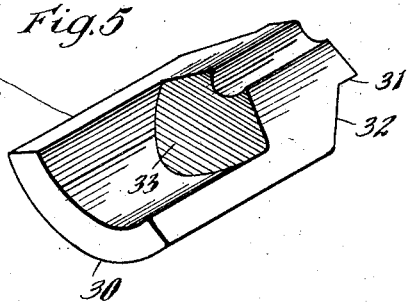
Witnesses
Wm. Geiger
Inventor
John F. O'Connor
By George J. Haight
His Atty Patented Mar. 24, 1925.

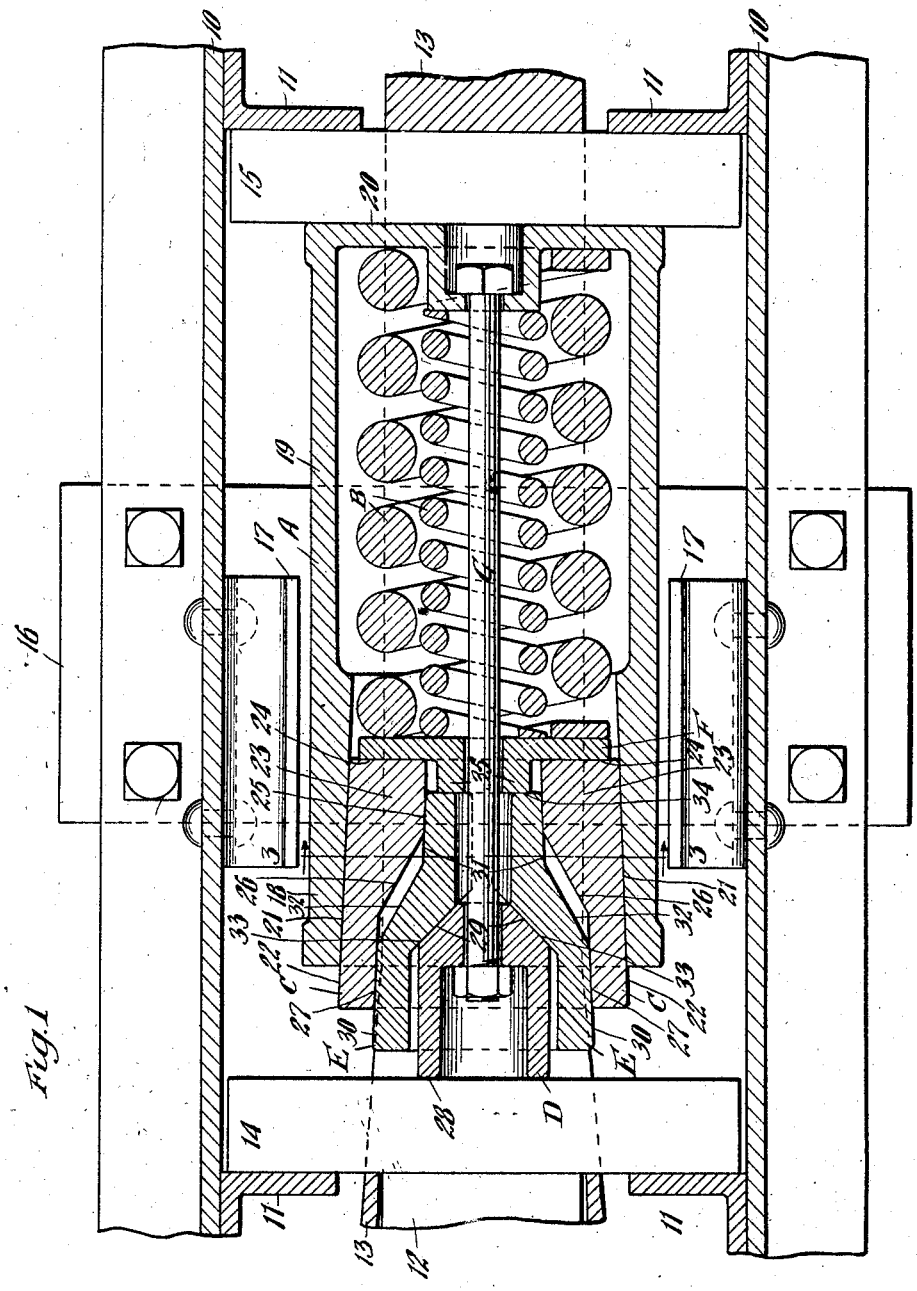

1,530,736

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed July 9, 1923, Serial No. 650,210. Renewed September 4, 1924.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism, especially adapted for railway draft riggings, wherein are obtained high capacity, certain release, and a relatively easy or low resistance preliminary action for predetermined distance followed by a high resistance during the remainder of the compression stroke.

A specific object of the invention is to provide a mechanism of the character indicated employing a friction unit having elements which, in part, are provided with blunt angle releasing wedge faces and, in part, provided with relatively keen wedge angle faces, the latter becoming effective only after a predetermined preliminary action.

A further specific object of the invention is to provide, in a mechanism of the character indicated, a friction shell, friction shoes, a pressure transmitting wedge, and auxiliary wedge shoe elements between the pressure transmitting wedge and the friction shoes, said auxiliary elements functioning as friction shoes proper during the preliminary part of the stroke and later as true acting wedges.

The invention furthermore consists in the improvements in the parts and devices and in the novel combinations of the parts and devices herein shown, described and made the subject of the claims.

In the drawings forming a part of this specification, Figure 1 is a horizontal, longitudinal, sectional view of a portion of a railway draft rigging showing my improvements in connection therewith. In this figure the section through the friction elements corresponds to two intersecting planes at 120° apart. Fig 2 is a front end elevation of the mechanism proper. Fig. 3 is a vertical transverse section of the mechanism proper corresponding to the line 3—3 of Fig. 1. And Figures 4 and 5 are detailed perspectives of one of the friction shoes and one of the auxiliary elements, respectively.

In said drawings, 10—10 denote the usual draft sills of a car under-frame to the inner faces of which are secured front and rear stops lugs 11—11 of well known construction. A portion of a draw-bar is indicated at 12, the same being operatively associated with the friction shock absorbing mechanism proper by a hooded cast yoke 13 within which is disposed said mechanism and front and rear main followers 14 and 15. The yoke and parts therewithin are supported in operative position by detachable saddle plate 16. The friction mechanism is of that character employing a substantial cylindrical shell and in order to maintain it in central position I preferably employ guide plates 17—17 secured to the inner faces of the draft sills.

The improved shock absorbing mechanism comprises, broadly, a combined friction shell and spring cage casting A; a spring resistance B; three friction shoes C—C arranged in a circular series; a pressure transmitting wedge D; three auxiliary wedge shoe elements E—E: a spring follower F; and a retainer bolt G.

The casting A, as heretofore mentioned, is of substantial cylindrical form throughout with the friction shell proper 18 formed at its front or outer end and the spring cage proper 19 rearwardly thereof. Said casting has an integral rear wall 20 abutting the rear follower 15. The shell proper 18 is provided on the interior thereof with three independent cylindric friction surfaces 21—21, each extending through an arc of approximately 120° and symmetrically arranged with respect to the axis of the shell. Said surfaces 21 are converged inwardly of the shell and, preferably, merge at their inner ends to constitute a complete circle.

The three friction shoes are of like construction, each having an outer cylindric friction surface 22 extending through an arc of approximately 120° and an enlargement 23 on its inner side. The rear end of said enlargement provides a bearing face 24 to engage the spring follower F. On its inner side, the enlargement 23 is formed with a longitudinally extending friction surface 25 of arcuate contour and forwardly thereof said enlargement has an inclined wedge face 26. Forwardly of the wedge face 26, each shoe has a longitudinally extending cylindric inner friction surface 27, as best indicated in Figures 1 and 4.

The wedge D is preferably in the form of a cored cast block having an outer or front transverse bearing face 28 engaging the follower 14 and, at its inner end, provided with three symmetrically arranged wedge faces 29—29.

The auxiliary elements E, three in number and of like construction, are formed with an outer cylindric friction surface 30 near the front or outer end thereof, and with a smaller cylindric friction surface 31 near the inner end thereof and on the outer side. Between the cylindric surfaces 30 and 31, each element E is provided with an outer wedge face 32 extending at the same angle as the shoe wedge faces 26. On its inner side, each element E is provided with an additional wedge face 33 extending at the same angle as and co-operable with the corresponding face 29 of the wedge D. The inner ends of the elements E are left flat as indicated at 34 to provide bearing surfaces engaging a central boss 35 formed on the front side of the spring follower F. As clearly shown in Figure 1, the spring B is interposed between the follower F and the rear end of the casting A. The parts are held in assembled relation and the spring under initial compression by the retainer bolt G which is anchored at its rear end within a hollow boss integral with the casting A, and, anchored at its front end within the cored opening of the wedge D.

In carrying out my invention, the co-operating sets of friction surfaces 27 and 30 and 25 and 31 of the shoes and auxiliary elements E will preferably be converged inwardly of the shell at the same angle as the shell friction surfaces 21. Furthermore, in the normal or full release condition of the parts, a space will be left between the sets of wedge faces 32 and 26 of the elements E and shoes C, respectively. As will also be clear from an inspection of Figure 1, the angle which said wedge faces 32 and 26 make with the axis of the mechanism is very much keener than the angle made by the blunt releasing angle wedge faces 29 and 33 of the wedge D and auxiliary elements E, respectively.

The operation of the mechanism is as follows, assuming a buff movement of the drawbar. As the draw-bar and front follower 14 move toward the right, as viewed in Figure 1, the wedge D will be moved in unison therewith. During the initial portion of the compression stroke, such wedge action as is obtained will be induced on the co-operating sets of blunt angle wedge faces 29 and 30 of the wedge D and elements E, the wedge faces of the elements E and shoes being out of engagement at this time. During this preliminary action the elements E act as friction shoes and slide longitudinally with respect to the shoes proper C on the co-operating sets of friction surfaces 27—30 and 25—31. Due to the convergence of the shell friction surfaces, the shoes C remain stationary or substantially so during this preliminary action with the result that the spring follower F will be removed from engagement with the inner ends of the shoes C while the auxiliary elements E are sliding longitudinally on the shoes C. Due to the convergence of the sets of friction surfaces 27—30 and 25—31, the auxiliary elements E will be given a differential action causing them to approach each other laterally during the preliminary part of the compression stroke. This preliminary action continues until the wedge faces 32 of the auxiliary elements E engage with the wedge faces 26 of the shoes C at which time said sets of wedge faces become effective, thus changing from a blunt angle wedge effect to a keen angle wedge effect for the balance of the compression stroke. Upon removal of the actuating pressure, it is obvious that the blunt angle wedge D will readily disengage itself from or collapse with respect to the auxiliary elements E. Thereupon the latter are free to collapse with respect to the shoes C and the spring B finally re-acts to project all of the parts outwardly to their normal full release position.

With a construction such as described, it is evident that the resistance offered during the preliminary part of the compression stroke is very much less than that offered during the balance of the compression stroke, so that I am enabled to obtain an easy, smooth and graduated action, with ultimate high frictional capacity combined with the necessary certain release of the parts.

I have herein shown and described the preferred manner of carrying out the invention, but the same is merely illustrative and all changes and modifications are contemplated that come within the scope of the claims appended hereto.

I claim:

1. In a friction shock absorbing mechanism, the combination with a friction shell having interior opposed friction surfaces; of a spring resistance; wedge friction shoes co-operable with the shell friction surfaces; pressure transmitting means having wedge faces; and auxiliary elements interposed between said means and shoes having wedge faces co-operable with those of said means and with those of said shoes, said elements and shoes having also co-operable friction surfaces independent of the co-operable wedge faces, the latter being normally out of operative engagement.

2. In a friction shock absorbing mechanism, the combination with a friction shell having interior opposed friction surfaces; of a spring resistance; wedge friction shoes co-operable with the shell friction surfaces; a pressure transmitting central wedge; and auxiliary elements interposed between said wedge and shoes having wedge faces engaging and co-operating with those of said wedge and having also additional wedge faces adapted to co-operate with those of the shoes, the latter being normally out of engagement, said elements and shoes having also co-operable friction surfaces extending lengthwise of the shell.

3. In a friction shock absorbing mechanism, the combination with a friction shell having interior opposed friction surfaces; of a spring resistance; wedge friction shoes co-operable with the shell friction surfaces; pressure transmitting means having wedge faces; and auxiliary elements interposed between said means and shoes having wedge faces co-operable with those of said means and with those of said shoes, said elements and shoes having also co-operable friction surfaces independent of the co-operable wedge faces, the latter being normally out of operative engagement, the co-operating wedge faces of said means and elements extending at one angle with respect to the axis of the shell and the co-operating wedge faces of said elements and shoes extending at a keener angle with respect to the axis of the mechanism.

4. In a friction shock absorbing mechanism, the combination with a friction shell having interior opposed friction surfaces; of a spring resistance; wedge friction shoes co-operable with the shell friction surfaces; a pressure transmitting central wedge; and auxiliary elements interposed between said wedge and shoes having wedge faces engaging and co-operating with those of said wedge and having also additional wedge faces adapted to co-operate with those of the shoes, the latter being normally out of engagement, said elements and shoes having also co-operable friction surfaces extending lengthwise of the shell, the co-operating wedge faces of said wedge and elements extending at a blunter angle with respect to the axis of the mechanism than the co-operating wedge faces of said elements and shoes.

5. In a friction shock absorbing mechanism, the combination with a member having longitudinally extending friction surfaces; of a spring resistance; wedge friction shoes co-operable with the said friction surfaces of said member; pressure transmitting means having wedge faces; and auxiliary elements interposed between said means and shoes having wedge faces co-operable with those of said means and wedge faces co-operable with those of said shoes, said elements and shoes having also co-operable friction surfaces independent of the co-operable wedge faces, the latter being ineffective at the initiation of a compression stroke.

6. In a friction shock absorbing mechanism, the combination with a friction shell having interior opposed friction surfaces; of a spring resistance; wedge friction shoes co-operable with the shell friction surfaces; pressure transmitting means having wedge faces; and auxiliary elements interposed between said means and shoes having wedge faces co-operable with those of said means and with those of said shoes, said elements and shoes having also co-operable friction surfaces independent of the co-operable wedge faces, the latter being normally out of operative engagement, said co-operating friction surfaces of said elements and shoes and co-operating friction surfaces of the shoes and shell being converged inwardly of the shell.

7. In a friction shock absorbing mechanism, the combination with a friction shell having interior opposed friction surfaces; of a spring resistance; wedge friction shoes co-operable with the shell friction surfaces; pressure transmitting means having wedge faces; and auxiliary elements interposed between said means and shoes having wedge faces cooperable with those of said means and with those of said shoes, said elements and shoes having also co-operable friction surfaces independent of the co-operable wedge faces, the latter being normally out of operative engagement, said co-operating friction surfaces of said elements and shoes being converged inwardly of the shell.

8. In a friction shock absorbing mechanism, the combination with a friction shell having interior opposed friction surfaces; of a spring resistance; wedge friction shoes co-operable with the shell friction surfaces; pressure transmitting means having wedge faces; and auxiliary elements interposed between said means and shoes having wedge faces co-operable with those of said means and with those of said shoes, said elements and shoes having also co-operable friction surfaces independent of the co-operable wedge faces, the latter being normally out of operative engagement, the friction surfaces of the shoes and shell being converged inwardly of the shell.

9. In a friction shock absorbing mechanism, the combination with a column acting member having longitudinally arranged friction surfaces thereon; of a spring resistance; a plurality of relatively keen angle wedge friction shoes co-operable with said surfaces of said member; a single pressure transmitting member having relatively blunt angle wedge faces; and auxiliary elements interposed between said member and shoes, each of said elements having wedge faces correspondingly inclined to and co-operable with the wedge faces of said member and shoes, respectively, said elements having also friction surfaces co-operable with corresponding friction surfaces of said shoes.

10. In a friction shock absorbing mechanism, the combination with a friction shell having interior cylindric friction surfaces converged inwardly of the shell; of a plurality of co-operating friction shoes, each of the latter having longitudinally spaced and laterally off-set friction surfaces on the inner side thereof with an intermediate wedge face, the friction surfaces of the shoes being converged inwardly of the shell; a spring resistance; a pressure transmitting wedge having blunt angle wedge faces; and a plurality of auxiliary elements interposed between said wedge and shoes, each of said elements having, on its outer side, longitudinally separated and off-set friction surfaces and an intermediate wedge face co-operable with the corresponding surfaces and faces of the shoes, said elements having also inner wedge faces co-operable with the wedge faces of said wedge.

11. In a friction shock absorbing mechanism, the combination with a friction shell having interior cylindric friction surfaces converged inwardly of the shell; of a plurality of co-operating friction shoes, each of the latter having longitudinally spaced and laterally off-set friction surfaces on the inner side thereof with an intermediate wedge face, the friction surfaces of the shoes being converged inwardly of the shell; a spring resistance; a pressure transmitting wedge having blunt angle wedge faces; and a plurality of auxiliary elements interposed between said wedge and shoes, each of said elements having, on its outer side, longitudinally separated and off-set friction surfaces and an intermediate wedge face co-operable with the corresponding surfaces and faces of the shoes, said elements having also inner wedge faces co-operable with the wedge faces of said wedge, the co-operating wedge faces of said wedge elements extending at a blunter angle to the axis of the mechanism than the co-operating wedge faces of said elements and shoes and the wedge faces of said elements and shoes being spaced from each other when the mechanism is in full release.

In witness that I claim the foregoing I have hereunto subscribed my name this 6th day of July 1923.

JOHN F. O'CONNOR.

Witnesses:
   FRANCES SAVAGE,
   HARRIETTE M. DEAMER.